United States Patent
Kaczmarek

(10) Patent No.: US 7,308,186 B2
(45) Date of Patent: Dec. 11, 2007

(54) DOMESTIC APPLIANCE, IN PARTICULAR A BUILT-IN DOMESTIC APPLIANCE

(75) Inventor: Wolfgang Kaczmarek, Schwindegg (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 35 days.

(21) Appl. No.: 10/539,824

(22) PCT Filed: Dec. 4, 2003

(86) PCT No.: PCT/EP03/13718

§ 371 (c)(1),
(2), (4) Date: May 5, 2006

(87) PCT Pub. No.: WO2004/056256

PCT Pub. Date: Jul. 8, 2004

(65) Prior Publication Data

US 2006/0280422 A1   Dec. 14, 2006

(30) Foreign Application Priority Data

Dec. 19, 2002   (DE) ................. 102 59 764

(51) Int. Cl.
   *G02B 6/00* (2006.01)
(52) U.S. Cl. .................. 385/147; 340/815.42; 385/25
(58) Field of Classification Search .................. None
   See application file for complete search history.

(56) References Cited

U.S. PATENT DOCUMENTS

| | | | |
|---|---|---|---|
| 2,358,425 A * | 9/1944 | Tickell | ........................ 340/585 |
| 2,737,573 A | 3/1956 | Olthuis | |
| 4,899,260 A * | 2/1990 | Schrammek et al. | ........ 362/551 |
| 5,974,213 A | 10/1999 | Maruchi et al. | |
| 2002/0153239 A1 | 10/2002 | Yoshida et al. | |
| 2004/0136682 A1* | 7/2004 | Watanabe | .................... 385/146 |
| 2006/0232997 A1* | 10/2006 | Rosenbauer et al. | ........ 362/621 |

FOREIGN PATENT DOCUMENTS

| | | |
|---|---|---|
| EP | 0 691 100 | 5/1999 |
| EP | 1 151 717 | 12/2003 |
| GB | 2 044 427 | 10/1980 |

* cited by examiner

*Primary Examiner*—Sung Pak
*Assistant Examiner*—Mike Stahl
(74) *Attorney, Agent, or Firm*—Russell W. Warnock; Craig J. Loest; James E. Howard

(57) ABSTRACT

A domestic appliance includes a cover element, an optical operation indicator that can be covered by the cover element, and a fibre optic coupled to the optical operation indicator for transmitting a emitted light signal. The fibre optic has a light route along which light is guided, the light route being configured such that it can be adapted to the thickness of the cover element, and the fibre optic is composed a first part and a second part that are displaceable relative to one another. The relative displacement of the first part and the second part of the fibre optic permit adaptation of the light route to the thickness of the cover element.

21 Claims, 6 Drawing Sheets

DOMESTIC APPLIANCE, IN PARTICULAR A BUILT-IN DOMESTIC APPLIANCE

Figure 1:
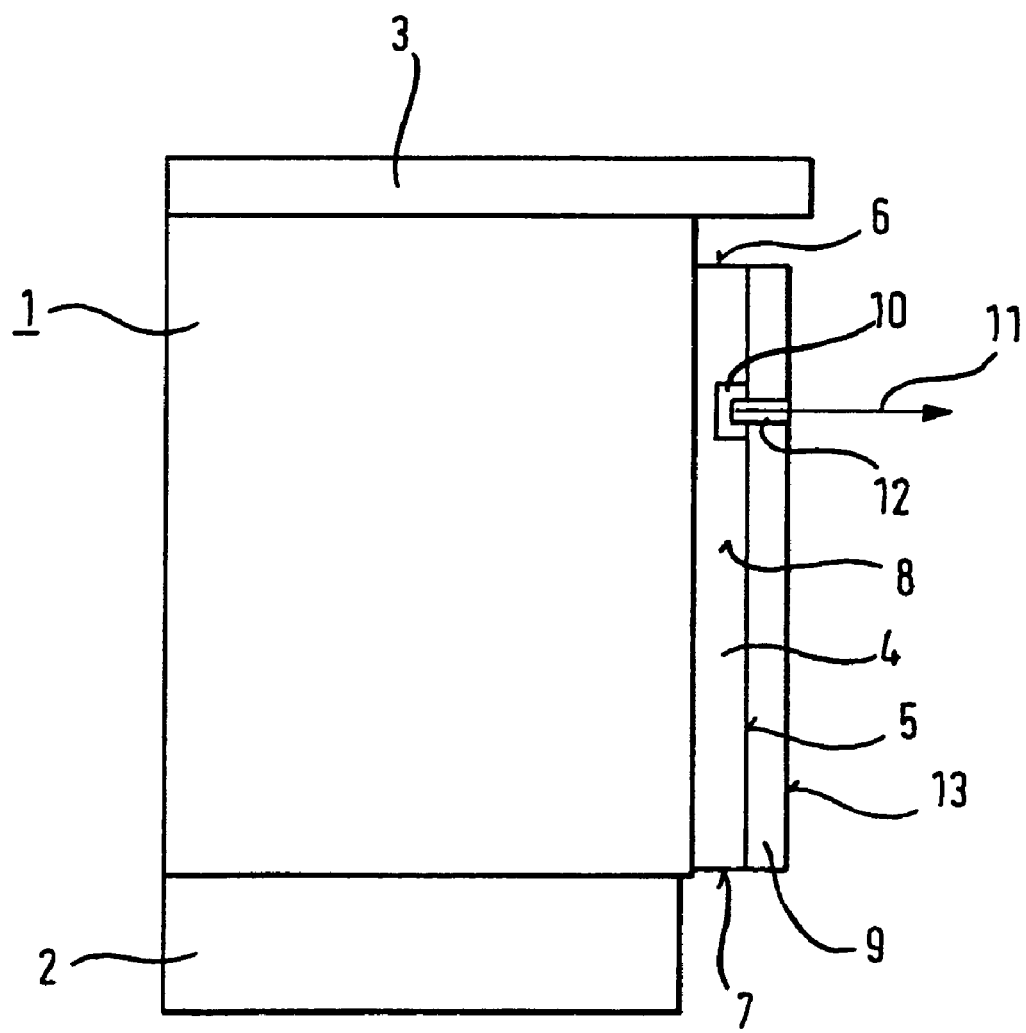

The invention relates to a domestic appliance, in particular a built-in domestic appliance, comprising at least one optical operation indicator, which can be covered by at least one cover element, at least one fibre optic being coupled to the optical operation indicator for transmitting at least one emitted light signal.

There are a variety of domestic appliances known, such as kitchen domestic appliances, which comprise essentially ovens, refrigerators, and dishwashers. With refrigerators and dishwashers in particular, there are what are referred to as fully-integratable appliances, of which the entire front surface is provided with an appliance front cladding, which can be adapted to the fronts of surrounding items of furniture. With a fully-integratable domestic appliance the problem arises that, when the front door of the fully-integratable domestic appliance is closed, an optical operation indicator is concealed by the front cladding of the appliance, with the result that the operational status of the fully-integratable domestic appliance cannot be checked.

From EP 0 691 100 A1 a built-in domestic appliance is known with a housing and a front door, whereby a light signal device is provided for at an upper edge of the front door, which indicates a specific operational status of the device, and which is concealed when the front door is closed. In this situation, means are provided between the upper edge of the front door and a surface running parallel to this edge which transfer a light emitted by the light signal device in the direction of the front side of the front door.

In DE 100 22 206 C2 a dishwasher capable of being built-in is described, with a pivotable appliance door, which exhibits an optical operation indicator on its upper front face with one of more light sources, which, with the appliance door closed, are covered by a work surface located on the dishwasher. In this situation, a fibre optic is connected to a steam protection element secured in position on the under side of the work surface above the appliance door, which conducts the light signal via the covered optical operation indicator to the front side of the appliance.

The disadvantage of the devices described in EP 0 691 100 A1 and DE 100 22 206 C2 lies in the fact that the light signal in the fibre optic is difficult to see for a user who is standing in front of the built-in domestic appliance, because the fibre optic is located in a gap between the under side of the work surface and the edge of the appliance door, and is covered from above by the work surface. In particular, recognition of the light signal is made difficult if a front cladding of considerable thickness is being used, since in this way the fibre optic is additionally covered from below by the front cladding of the appliance.

The invention is based on the problem, in respect of a domestic appliance, in particular a built-in domestic appliance, of improving the visibility of the light signal of at least one optical operation indicator.

This problem is resolved with a domestic appliance of the type referred to in the preamble in that the fibre optic is designed in such a way that its light route is adjustable to the thickness of the cover element.

As a result of the fact that the light route of the fibre optic can be adjusted to the thickness of the cover element, it is a simple matter for the visibility of the light signal being conducted by the fibre optic to be ensured for the user, since even with cover elements of particular thickness a sufficiently large area of the fibre optic remains freely visible.

According to a preferred embodiment of the invention, in order for the light route to be adjusted to the thickness of the cover element, the fibre optic can be displaced relative to the optical operation indicator.

According to a further preferred embodiment of the invention, in order for the light route to be adjusted to the thickness of the cover element, a projecting over-length is provided for the fibre optic, in order for the fibre optic to be capable of displacement relative to the optical cover element. With this measure, the advantage is achieved that only one fibre optic of one single length, and not fibre optics of different lengths, need to be provided with the domestic appliance, which would otherwise be necessary in order to allow the user to select the fibre optic which exhibits the appropriate length to suit the cover element which is being used. In this way, the storage of the domestic appliance is also made easier, since only one type of fibre optic needs to be kept in stock, and not fibre optics of different lengths.

In a next further embodiment, the optical operation indicator is designed in such a way that at least the operational states of the domestic appliance, switched on and/or off, can be signalled.

As a result, it is possible, with the front door of the domestic appliance closed, to determine whether the appliance is switched on or off. This is of particular advantage with dishwashers, since the inadvertent opening of the front door with the device switched on may lead to water emerging.

According to an advantageous embodiment of the invention, the optical operation indicator is designed in such a way that light signals of different colours can be emitted for different operational states. In this way, it is possible for the same fibre optic to be used for the transfer of the light signal of the different operational states, since the different operational states can be differentiated due to the different colours of the light signal.

Further features of the invention and advantageous embodiments of the invention are characterised in the sub-Claims.

With the invention, with a domestic appliance, in particular a built-in domestic appliance, the visibility of the light signal of at least one optical operation indicator is substantially improved.

Figure 2:
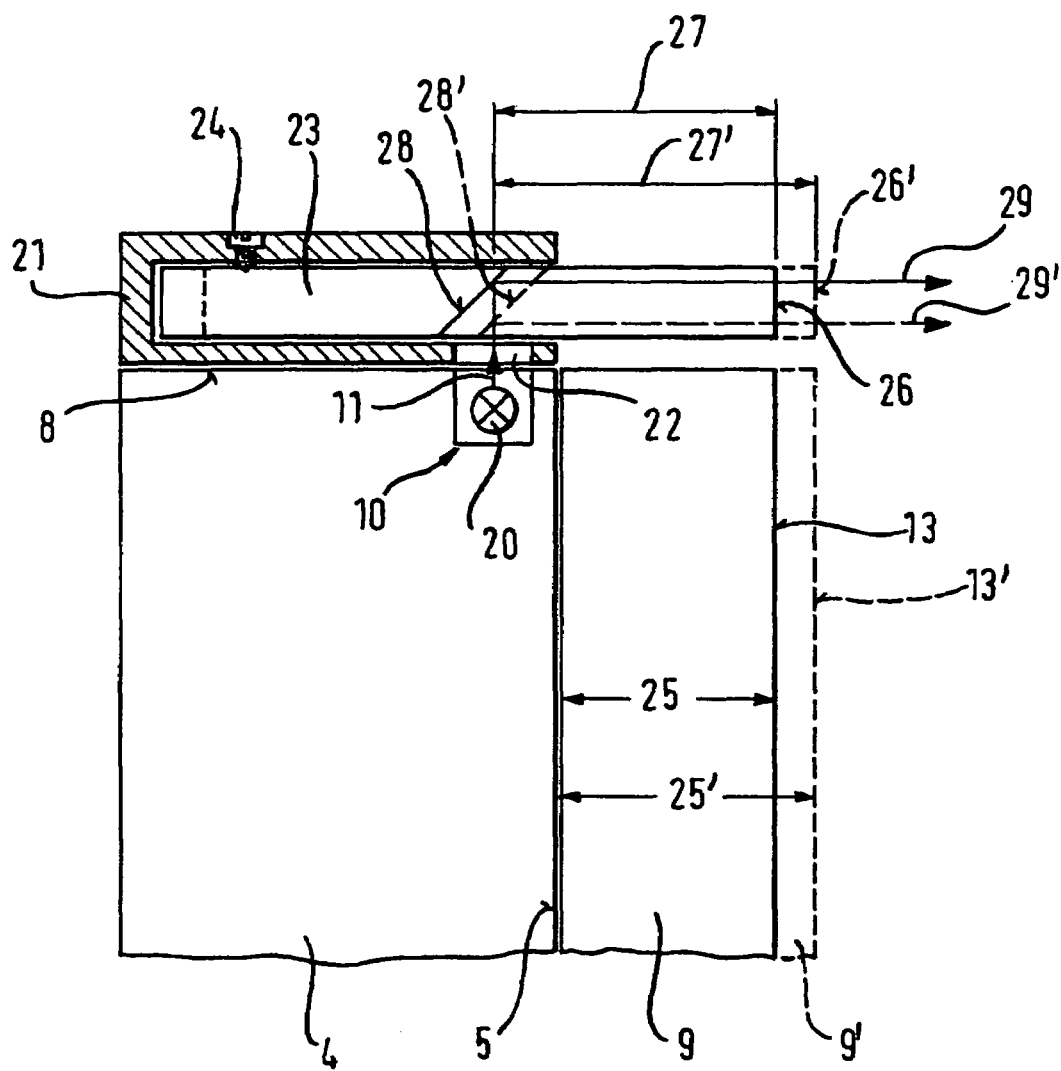
Figure 3:
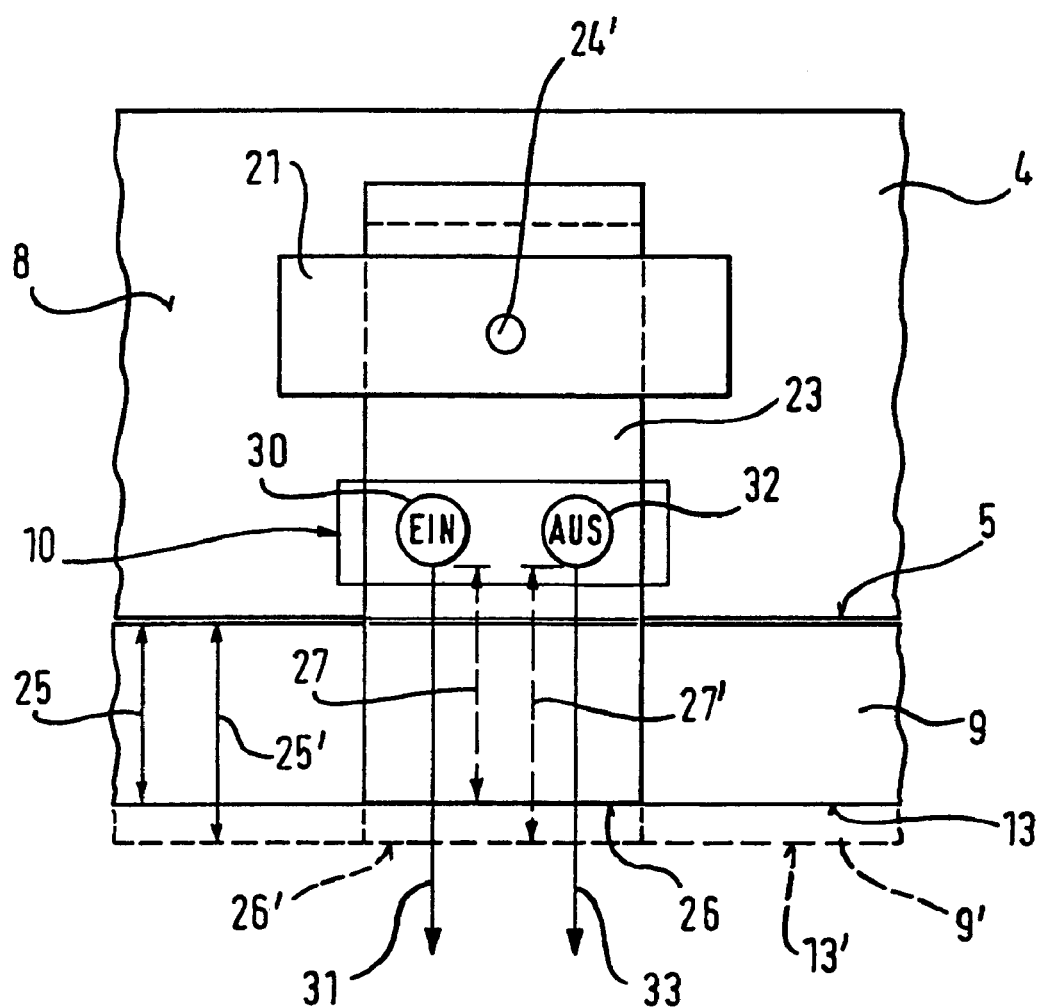
Figure 4:
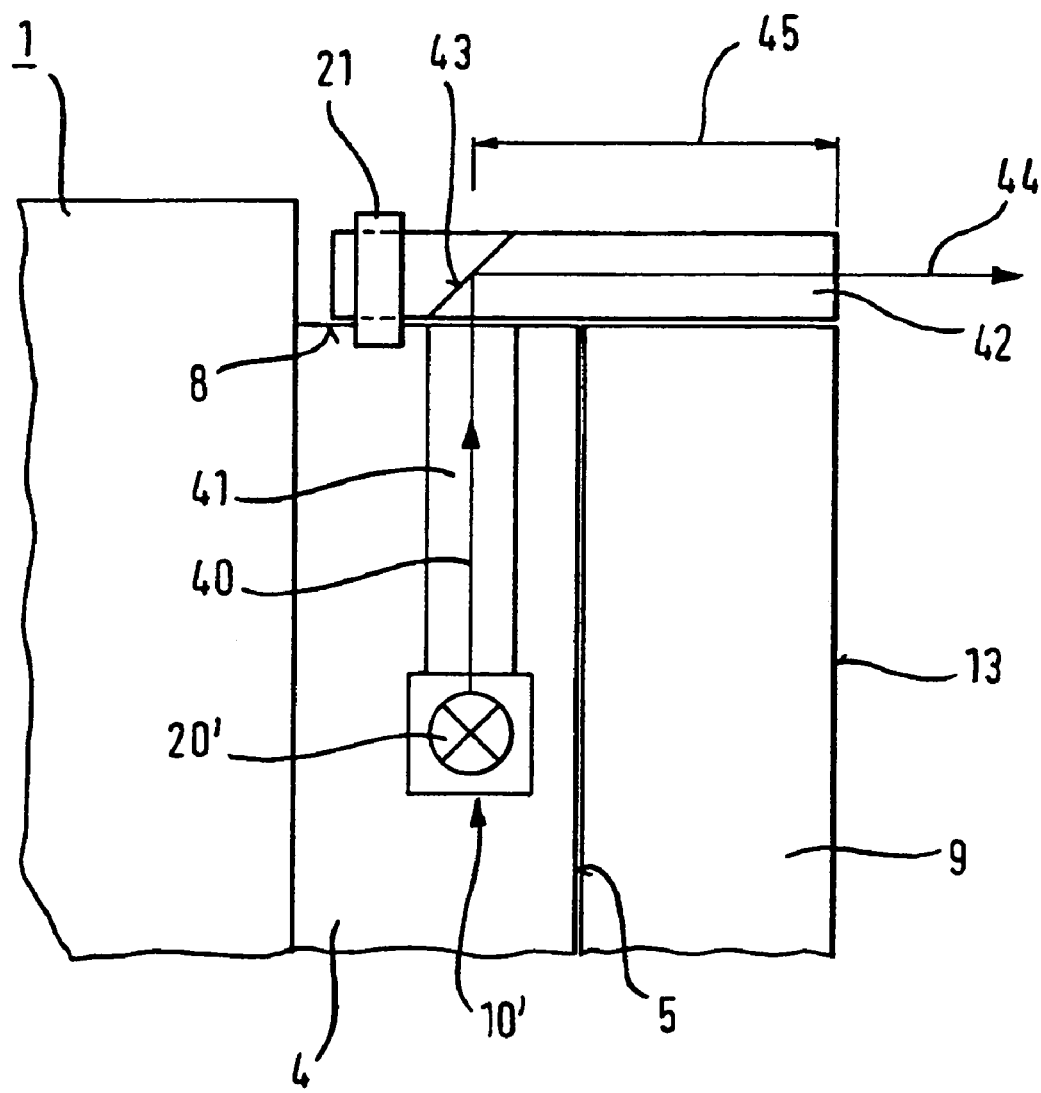
Figure 5:
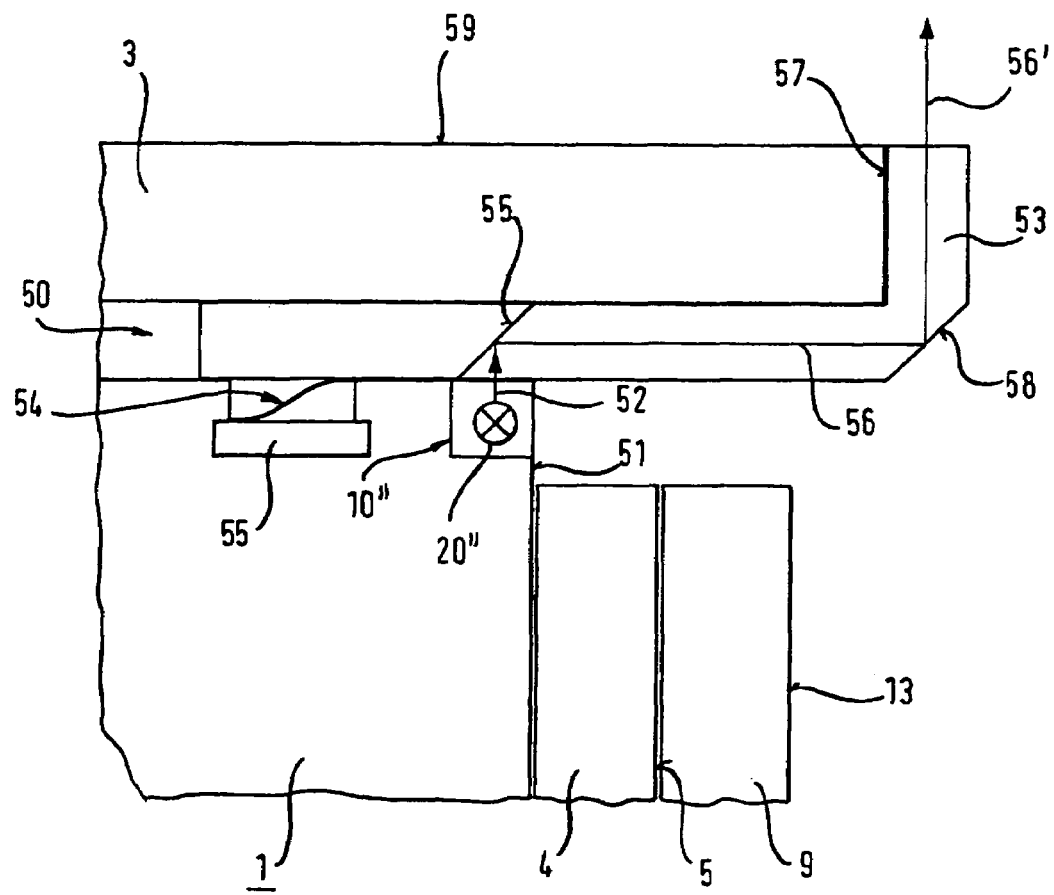
Figure 6:
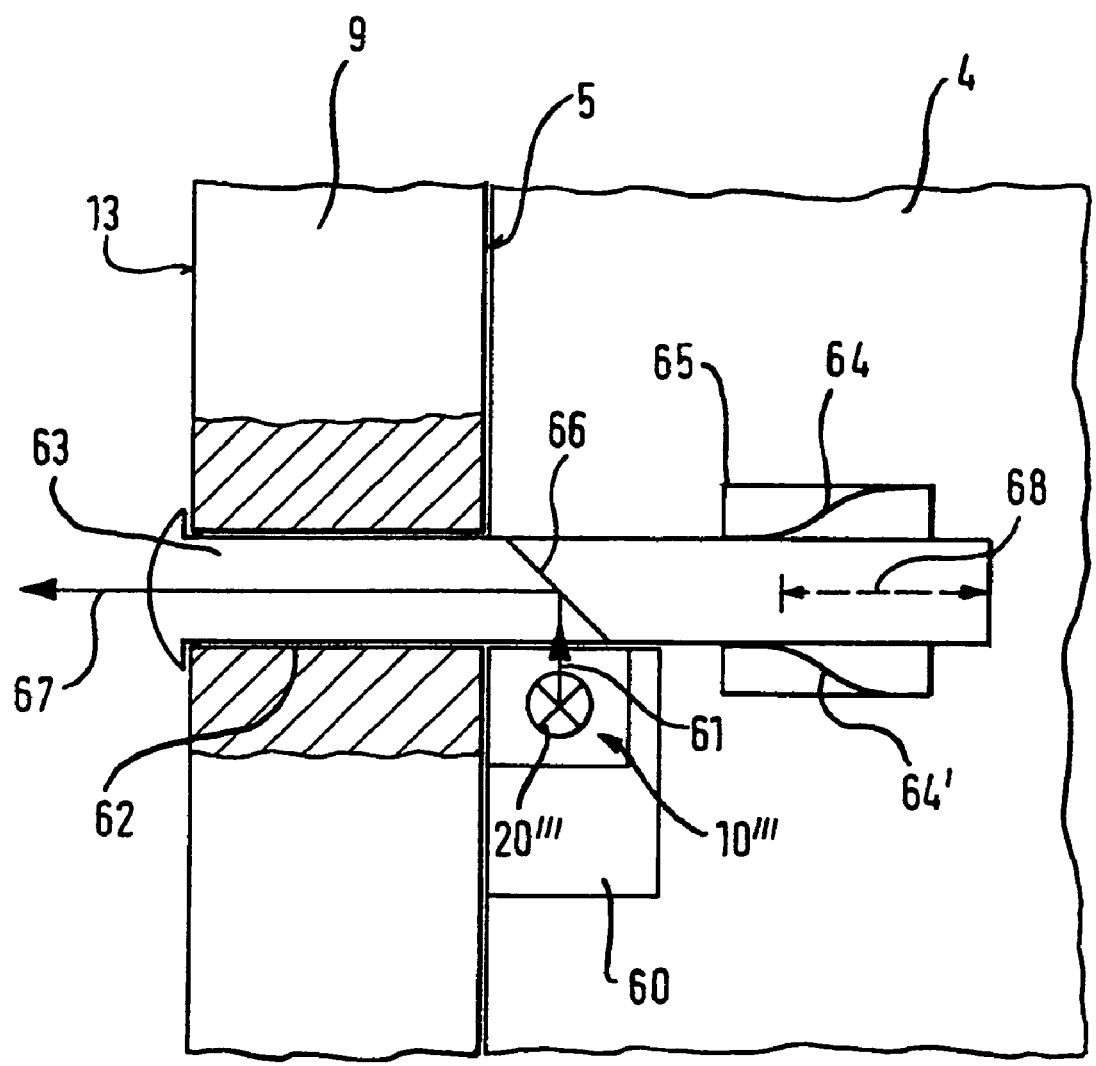

The invention and its further embodiments are explained in greater detail hereinafter on the basis of drawings:

These show:

FIG. 1 A diagrammatic side view of a domestic appliance with a work surface and an appliance front cladding as cover elements, FIG. 2 A diagrammatic sectional representation of a part of the domestic appliance according to FIG. 1 to illustrate an adjustment of a light route to different thicknesses of the appliance front cladding, FIG. 3 A diagrammatic plan view of a part of the domestic appliance according to FIG. 2, FIG. 4 A diagrammatic sectional representation of a part of the domestic appliance according to FIG. 1 to illustrate a position of a fibre optic, if a front door of the domestic appliance comprises the optical operation indicator, FIG. 5 A diagrammatic sectional representation of a part of the domestic appliance according to FIG. 1 to illustrate a position of a fibre optic, if the housing of the domestic appliance comprises the optical operation indicator, and FIG. 6 A diagrammatic sectional representation of a part of the domestic appliance according to FIG. 1 with an appliance front cladding which comprises a fibre optic with a projecting length for adjusting the light route.

The domestic appliance 1, shown in a diagrammatic side view in FIG. 1, which in particular is a dishwasher or refrigerator, rests on a pedestal 2 and is covered by a work surface 3. The domestic appliance 1 comprises a front door 4 with a front surface 5, an upper edge 6, a lower edge 7, and side edges 8. On the front surface 5 of the front door 4 is located an appliance front cladding 9, as cover element, which can be what is referred to as a furniture panel.

The light signal 11 is emitted from the optical operation indicator 10, which is located at the side edge 8 of the front door 4, and with the aid of the fibre optic 12 is conducted to the front side 13 of the appliance front cladding 9, so that the operational state of the domestic appliance 1 can be checked even with the front door 4 closed.

FIG. 2 shows an adjustment of a light route to different thicknesses of the appliance front cladding.

The side edge 8 of the front door 4 of the domestic appliance 1 comprises an optical operation indicator 10 with a light-emitting diode 20, which emits a light signal 11 in a direction perpendicular to the side edge 8. Mounted on the side edge 8, as a fixed device, is a bar 21, with a cut-out or aperture 22 at the position of the optical operation indicator 10. The bar 21 comprises a fibre optic 23, into which the light signal 11 is coupled through the cut-out or aperture 22. This fibre optic 23 is capable of displacement in the bar 21 parallel to the perpendicular edge 8 relative to the optical operation indicator 10, and can be fixed in the bar 21 by a recessed-head screw 24.

For an appliance front cladding 9 with a with a thickness 25, the fibre optic 23 is displaced in such a way that its front face ends at a position 26 in contact with the front side 13 of the appliance front cladding 9. In this way the light route 27 can be adjusted to the thickness 25 of the appliance front cladding 9. For an appliance front cladding 9 with a with a thickness 25', the fibre optic 23 is displaced in such a way that its front face ends at a position 26' in contact with the front side 13' of the appliance front cladding 9'. In this way, the light route 27' is adjusted to the thickness 25' of the appliance front cladding 9'.

In addition to this, the fibre optic 23 comprises an oblique light-reflecting surface, which depending on the thickness 25 or 25' of the appliance front cladding 9 or 9', is located at the position 28 or 28'. In this way it can be guaranteed that the reflected light signal 29 or 29' respectively will be reflected at right angles in the direction of the front side 13 or 13' of the appliance front cladding 9 or 9' and will be easily visible there.

In the plan view in FIG. 3, the side edge 8 of the front door 4 of the domestic appliance 1 can be seen, which comprises the optical operation indicator 10, with a red light emitting diode 30, which emits a red light signal 31 and in the embodiment example shown signals the ON operating state, and with a green light emitting diode 32, which emits a red light signal 33, signals the OFF operating state in the embodiment example shown.

The light signals 31 and 33 emitted by the light emitting diodes 30 and 32 are coupled, as described in FIG. 2, into the disk-shaped fibre optic 23 and conducted by this as far as the front side 13 or 13' respectively of the appliance front cladding 9 or 9' respectively. The adjustment of the light route 27 or 27' respectively of the displaceable fibre optic 23 to the different thicknesses 25 or 25' respectively of the appliance front cladding 9 or 9' respectively is effected as described in FIG. 2. At the front side 13 or 13' respectively of the appliance front side 9 or 9' respectively, the light signal 31 or the signal 33 is then visible, depending on the operational state being ON or OFF.

In this way it is possible, with the front door 4 of the domestic appliance 1 closed, for a user to determine at least whether the appliance 1 is switched off or on. This is particularly advantageous if the appliance 1 is a dishwasher, since the unintentional opening of the front door 4 in the ON operating state can in this case lead to water emerging.

Thanks to the use of light-emitting diodes 30, 32 of different colours it is possible to use the same fibre optic 23 for signalling the different operating states ON, OFF, since the different operating states ON, OFF can be differentiated by the different colours of the light signal 31, 33. In particular, the optical operation indicator 10 can comprise several light-emitting diodes with different colours for the display of several operating states. Even for the operating state ON and OFF a colour selection is not restricted to red and green. Instead of light-emitting diodes, other light media can also be used, such as fluorescent bulbs.

In FIG. 4 a further embodiment of the invention is shown, in which a front door 4 of the domestic appliance 1 comprises the optical operation indicator. The front door 4 of the domestic appliance 1 comprises, as well as the edges 6, 7, 8, an optical operation indicator 10' with a light-emitting diode 20', which emits a light signal 40 in the direction of the side edge 8 of the front door 4. At the optical operation indicator 10', a first part of the fibre optic 41 is arranged in a bundle in such a way that the light signal 40 can be transferred from the optical operation indicator 10' as far as the side edge 8 of the front door 4. This first part of the fibre optic 41 can also consist of a bundle of glass or plastic fibres.

Arranged on the side edge 8 of the front door 4 is a second part of the fibre optic 42, at a right angle to the first part of the fibre optic 41. This second part of the fibre optic 42 comprises an oblique reflecting surface 43, so that the light signal 40 is reflected from this surface 43 in the direction of the front side 13 of the appliance front cladding 9. The second part of the fibre optic 42 conducts the reflected light signal 44 away via the appliance front cladding 9, so that the reflected light signal 44 is visible at the front side 13 of the appliance front cladding 9.

The second part of the fibre optic 42 is capable of displacement relative to the first part of the fibre optic 41, in order to allow, as described in FIG. 2, for the adaptation of the light route 45 to different thicknesses of the appliance front cladding 9. As a result, it is ensured that a sufficiently large area of the second part of the fibre optic 42 is visible to the user, so that the light signal 44 can be easily recognised.

If the optical operation indicator 10' emits the light signal 40 in the direction of the lower edge 7 or the upper edge 6 of the front door 4, then the arrangement described above of the first part of the fibre optic 41 and of the second part of the fibre optic 42 can also be provided for at the lower edge 7 or upper edge 6 respectively of the front door 4. In particular, the first part of the fibre optic 41 can consist either of a rigid bar-shaped or cylindrical fibre optic, or of a bundle of glass fibres or plastic fibres. Because the fibres are flexible, the first part of the fibre optic 41 can in this case be curved, as a result of which the light signal 40 can also be conducted from positions of the optical operation indicator 10' to the edges 6, 7, 8, which are difficult to access with rigid fibre optics 41.

FIG. 5 shows a further embodiment of the invention, in which a housing 50 of the domestic appliance 1 contains the optical operation indicator. The housing 50 of the domestic appliance 1 contains, on the front side 51 of the domestic appliance 1, below the work surface 3, an optical operation indicator 10" with a light-emitting diode 20", which emits a light signal 52 in the direction of the work surface 3. Located beneath the work surface 3 is a fibre optic 53, capable of being displaced parallel to the work surface 3, with which the light route can, in a manner analogous to FIG. 2, be adapted to the width of the work surface 3. The displaceable fibre optic 53 can be fixed in the selected position by means of the clamp 54 of the fixing device 55.

The light signal 52 emitted by the optical operation indicator 10″ is coupled transversely into the displaceable fibre optic 53, is there reflected on a first oblique light-reflecting surface 55 at a right angle, so that the reflected light signal 56 extends parallel to the work surface 3 in the displaceable fibre optic 53. The reflected light signal 56 is conducted from the displaceable fibre optic 53 via the front door 4 of the domestic appliance 1 and via the appliance front cladding 9 away in the direction of the front side 13 of the appliance front cladding 9. The fibre optic 53 surrounds the work surface 3 at its front face 57 at a right angle in such a way that the reflected light signal 56 is reflected on a second oblique light-reflecting surface 58 of the fibre optic 53 perpendicular to the surface 59 of the work surface 3, so that the doubly-reflected light signal 56′ is easily visible.

FIG. 6 shows a further embodiment of the invention, in which an appliance front cladding 9 comprises a fibre optic 63 with a projecting length 68 for the adaptation of the light route. The front door 4 of the domestic appliance 1 comprises, on its front face 5, behind the appliance front cladding 9, a control unit 60 with an optical operation indicator 10‴, which in turn comprises a light-emitting diode 20‴, which emits a light signal 61. The appliance front cladding 9 exhibits, at the position of the optical operation indicator 10‴, as a passage aperture, a hole 62, which passes through as far as the front side 13 of the appliance front cladding 9, which is designed in particular as cylindrical and which comprises the displaceable fibre optic 63.

The displaceable fibre optic 63 is fixed by means of two clamps 64 and 64′ of the fixing device 65 flush at the optical operation indicator 10. The light signal 61 emitted from the light-emitting diode 20‴ can in this way be coupled directly into the fibre optic 63, then reflected on the light-reflecting surface 66 in the direction of the front side 13 of the appliance front cladding 9, and is conducted by the fibre optic 63 to the front side 13 of the appliance front cladding 9, so that the reflected light signal 67 is visible there.

An advantage of this embodiment consists of the fact that in this case the length of the light route can be adapted to the thickness of the appliance front cladding 9, since the fibre optic 63 is provided with a corresponding projection length 68, about which it can be displaced relative to the appliance front cladding 9. In addition to this, the fibre optic 63 can be formed simply by a piece of cylindrical glass or plastic, as a result of which the fibre optic 63 is extremely economical.

If there are several optical operation indicators 10‴ present on the front door 4 of the domestic appliance 1, or if the optical operation indicator comprises several light-emitting diodes 20‴, in order to signal several different operational states, then the embodiment described above can be present in multiple form. In this way, several displaceable fibre optics 63 can be provided in order to transfer light signals relating to different operational states. In particular, these displaceable fibre optics 63 can be designed in different colours so as to differentiate between the different operational states. In addition to this, the hole 62 can also be designed in such a way that it comprises several fibre optics 63, which are arranged next to one another and/or below one another.

Thanks to the invention, with a domestic appliance 1, in particular with a built-in domestic appliance, the visibility of the light signals of at least one optical operation indicator 10 can be substantially improved.

The invention is:

1. A domestic appliance, comprising:
at least one cover element;
at least one optical operation indicator that can be covered by the at least one cover element; and
at least one fibre optic coupled to the at least one optical operation indicator for transmitting at least one emitted light signal, the at least one fibre optic having a light route along which light is guided, the light route being configured such that it can be adapted to the thickness of the at least one cover element, and the at least one fibre optic being composed a first part and a second part that are displaceable relative to one another, the relative displacement of the first part and the second part of the at least one fibre optic permitting adaptation of the light route to the thickness of the at least one cover element.

2. The domestic appliance according to claim 1, wherein the at least one fibre optic is displaceable relative to the at least one optical operation indicator for adapting the at least one light route to the thickness of the at least one cover element.

3. The domestic appliance according to claim 1, and further comprising a projection length on the at least one fibre optic for displacement of the at least one fibre optic relative to the at least one cover element so as to facilitate adaptation of the at least one light route to the thickness of the at least one cover element.

4. The domestic appliance according to claim 2, and further comprising a fixing device for fixedly securing the at least one fibre optic in a predetermined displacement position.

5. The domestic appliance according to claim 1, wherein the at least one cover element is configured as a selected one of a front door, an appliance front cladding, and a work surface arranged in front of the appliance front cladding.

6. The domestic appliance according to claim 1, wherein the at least one cover element includes edge areas and the at least one fibre optic is arranged in at least one of the edge areas of the at least one cover element.

7. The domestic appliance according to claim 1, wherein the at least one cover element includes an upper edge area and the at least one fibre optic is arranged outside of the upper edge area of the at least one cover element.

8. The domestic appliance according to claim 1, wherein the coupling location of the at least one fibre optic is arranged at the at least one optical operation indicator in a location behind the at least one cover element.

9. The domestic appliance according to claim 8, and further comprising at least one passage aperture disposed in the at least one cover element and receiving therethrough the at least one fibre optic.

10. The domestic appliance according to claim 1, wherein the coupling location of the at least one fibre optic to the at least one optical operation indicator is arranged inside the housing of the domestic appliance.

11. The domestic appliance according to claim 1, wherein the at least one fibre optic is configured as a selected one of a bar, a disk, and a cylinder.

12. The domestic appliance according to claim 1, wherein the at least one fibre optic is configured as a selected one of a rigid fibre optic and a flexible fibre optic.

13. The domestic appliance according to claim 1, wherein the at least one fibre optic is configured that the at least one emitted light signal is transferred onto the front side of the at least one cover element.

14. The domestic appliance according to claim 1, wherein the at least one fibre optic is comprised of at least one glass fibre.

15. The domestic appliance according to claim 1, wherein the at least one fibre optic is comprised of at least one plastic fibre.

16. The domestic appliance according to claim 1, wherein the at least one optical operation indicator is operable to at least signal the operational states (ON, OFF) of the domestic appliance.

17. The domestic appliance according to claim 1, wherein the at least one optical operation indicator includes at least one light-emitting diode.

18. The domestic appliance according to claim 1, wherein the at least one optical operation indicator emits a light signal of a different colour for each of the different operational states (ON, OFF) of the domestic appliance.

19. The domestic appliance according to claim 16 and further comprising a plurality of fibre optics for transferring a light signal relating to the different operational states (ON, OFF) of the domestic appliance.

20. The domestic appliance according to claim 19, wherein the fibre optics are comprised of different colours for displaying the different operational states (ON, OFF) of the domestic appliance.

21. The domestic appliance according to claim 1, wherein the domestic appliance is a dishwasher.

* * * * *